United States Patent

Leonard

[11] 3,922,873
[45] Dec. 2, 1975

[54] HIGH TEMPERATURE HEAT RECOVERY IN REFRIGERATION

[75] Inventor: Louis H. Leonard, Dewitt, N.Y.

[73] Assignee: Carrier Corporation, Syracuse, N.Y.

[22] Filed: Nov. 14, 1974

[21] Appl. No.: 523,639

[52] U.S. Cl. .................. 62/84; 62/101; 62/115; 62/468; 62/476; 62/483; 165/63
[51] Int. Cl.² ................................. F25B 43/02
[58] Field of Search ....... 62/84, 101, 109, 112, 115, 62/238, 468, 476, 483; 165/63

[56] References Cited
UNITED STATES PATENTS

| | | | |
|---|---|---|---|
| 1,109,923 | 9/1914 | Hiller | 62/489 X |
| 2,307,380 | 1/1943 | Baker | 62/101 |
| 2,548,699 | 4/1951 | Bernat et al. | 62/483 |
| 3,811,291 | 5/1974 | Schibbye | 62/84 |
| 3,848,422 | 11/1974 | Schibbye | 62/468 X |

Primary Examiner—William F. O'Dea
Assistant Examiner—Peter D. Ferguson
Attorney, Agent, or Firm—J. Raymond Curtin; Thomas J. Wall

[57] ABSTRACT

A high lift energy reclaiming circuit for use in a vapor compression refrigeration system, the circuit being interposed in the system between the compressor discharge line and the condenser inlet line. Referigerant vapors discharged from the compressor are exposed to, and condensed into, a strong absorbent solution to develop temperatures within the mixture that are in excess of the saturation temperature of the discharge vapors. The mixture is brought into a heat exchanger where the high temperature energy is recovered by a heat reclaiming substance, such as water or the like. The diluted absorbent in the mixture is then separated from unabsorbed refrigerant vapors and the dilute solution flash cooled by expanding the solution to the inlet pressure of the compressor. The separated unabsorbed refrigerant vapors, which are still at or about saturation, are brought into thermal communication with the flash cooled solution in a concentrator where the unabsorbed refrigerant vapors are condensed, or partially condensed, to boil refrigerant from the dilute solution. This reconcentrated solution is recycled in the high lift circuit and the freed vapors delivered to the inlet of the compressor. All of the remaining unabsorbed refrigerant vapors not condensed to concentrate the dilute solution are passed on to a standard refrigeration condenser where they are condensed. The liquid condensate from this refrigeration condenser and the liquid condensate from the vessel in which the dilute solution is reconcentrated, the concentrator, are collected together in a common collection chamber, the float chamber, and together passed through an expansion device into the evaporator where the liquid refrigerant is again used as the evaporate to accomplish chilling in a conventional manner.

24 Claims, 2 Drawing Figures

HIGH TEMPERATURE HEAT RECOVERY IN REFRIGERATION

BACKGROUND OF THE INVENTION

This invention relates to energy reclaiming and, in particular, to developing a high temperature lift in a vapor compression refrigeration system to enhance the system's heat reclaiming characteristics.

Most efforts heretofore directed toward recovering energy normally rejected from refrigeration systems have been relatively unsuccessful. The reason for this lack of success is basically due to the fact that the energy rejected from these systems is at or close to the refrigerant saturation condition. In many vapor compression cycles, the saturation temperature of the refrigerant seldom exceeds 120°F even when a highly efficient compressor is employed. Consequently, this low temperature energy cannot be readily utilized in most domestic and industrial applications which, for the most part, demand higher temperatures.

The present invention involves a high lift circuit suitable for use in conjunction with a conventional vapor compression refrigeration cycle that is capable of developing high temperatures on the high pressure side of the system to enhance the heat reclaiming characteristics of the system. This high lift is achieved by exposing refrigerant vapors discharged from the compressor to a strong absorbent solution. The discharge refrigerant vapors are partially absorbed and condensed by the solution, thus creating a mixture that is at a temperature level well above that normally attainable in the art. The high temperature energy is recovered in a heat exchanger. Energy remaining in the unabsorbed vapors is utilized to reconcentrate the diluted solution. Pure refrigerant is separated from the solution and reused in the refrigeration system, while the reconcentrated solution is recycled through the high lift circuit.

In U.S. Pat. No. 2,307,380 to Baker, a refrigeration system is disclosed which brings together some of the principles utilized in both the absorption and vapor compression refrigeration art. The Baker system involves a basic ammonia-water absorption cycle. A mechanical compressor is employed to provide energy for concentrating the absorbent solution rather than a more conventional heat actuated generator. The energy rejected from the Baker system is at or about the saturation temperature of the refrigerant and, as a consequence, cannot readily be reclaimed. As such, the system suffers from the same disadvantages found in the prior art.

SUMMARY OF THE INVENTION

It is therefore an object of the present invention to improve the refrigeration processes.

It is another object of the present invention to efficiently develop a high temperature lift in a vapor compression refrigeration cycle.

A still further object of the present invention is to provide a high temperature lift in refrigeration cycles utilizing a compressor without having to increase the lift capacity of the compressor.

Yet another object of the present invention is to provide a high temperature heat reclaiming cycle which is applicable to existing refrigeration apparatus.

Another object of the present invention is to combine the advantages of a vapor compression refrigeration cycle with those of an absorption refrigeration cycle in a manner to provide an efficient heat reclaiming system capable of producing energy at temperatures higher than normally found in either of these individual systems.

A still further object of the present invention is to efficiently develop a high temperature lift suitable for heat reclaiming applications in conventional refrigeration devices while utilizing working fluids known in the art.

These and other objects of the present invention are attained in a vapor compression refrigeration device by means of a high lift circuit operatively connected to the refrigeration unit between the discharge of the compressor and the inlet to the condenser, the high lift circuit including means to mix at least some of the discharge refrigerant vapors with a strong solution of absorbent to develop a high temperature mixture, a heat exchanger for transferring the high temperature energy to a heat reclaiming substance, such as water, means for separating unabsorbed refrigerant vapors from the diluted solution, means to reconcentrate the diluted solution using the energy contained in the unabsorbed vapors, and means to recirculate pure refrigerant through the refrigeration unit and the reconcentrated solution through the high lift circuit.

BRIEF DESCRIPTION OF THE DRAWINGS

For a better understanding of the present invention as well as other objects and further features thereof, reference is had to the following detailed description of the invention to be read in conjunction with the accompanying drawings, wherein.

DESCRIPTION OF THE PREFERRED EMBODIMENT

Figure 1:
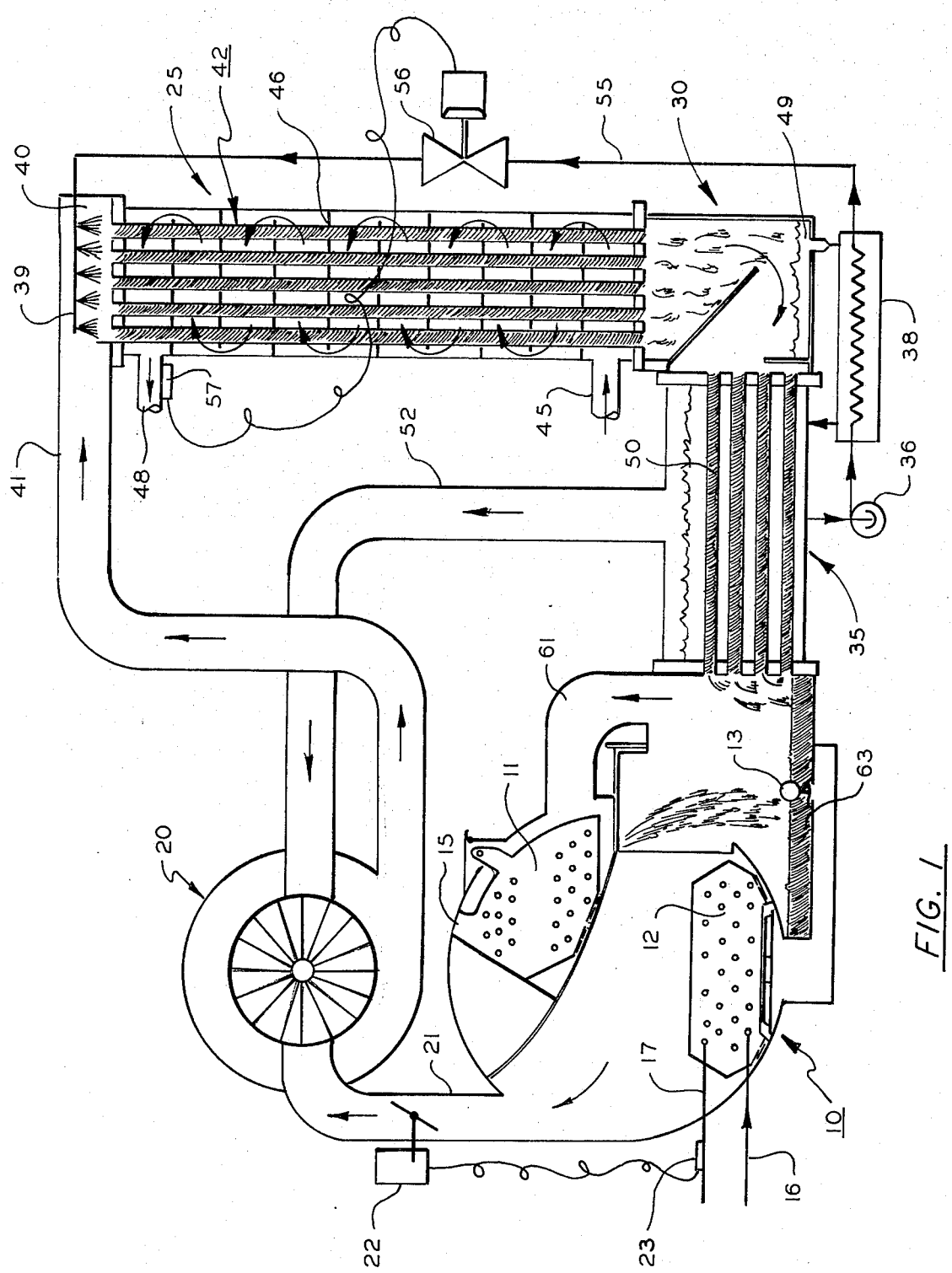
FIG. 1 is a schematic representation of a vapor compression refrigeration system utilizing the teachings of the present invention for developing a high temperature lift.

Referring now to FIG. 1, there is shown a schematic representation of a vapor compression refrigeration system 10 utilizing the teachings of the present invention for developing a high temperature lift whereby energy rejected from the system can be utilized for industrial and domestic heating applications. As is conventional in most vapor compression refrigeration cycles, the present apparatus includes a condenser 11 and an evaporator 12, which are operatively connected by means of a float valve 13 through which refrigerant is expanded as it moves from the high pressure side of the system into the low pressure side. For illustrative purposes, the above-noted refrigeration components are shown housed within a single shell 15, however, it should be clear that the components can be individually housed without departing from the teachings of the present invention. As is conventional in this type of refrigeration cycle, a substance to be chilled, such as water, is fed into the evaporator via an inlet pipe 16, passed through a series of evaporator tubes where the substance rejects heat energy into the refrigerant, and is passed out of the system by means of an outlet pipe 17. Refrigerant, in vapor form, leaves the evaporator and is delivered to the inlet side of a compressor 20 via inlet channel 21. The compressor 20, shown in FIG. 1, is contemplated as being electrically driven and hermetically sealed, although almost any type of mechanical compressor known and used in the art can be so employed in the practice of the present invention.

For explanatory purposes, the present invention will be described in reference to a machine employing R-11 as a refrigerant, however, any suitable refrigerant used in compression refrigeration and any absorbent combination compatible with the chosen refrigerant can be used. Typically, with R-11, the low pressure side of the system is maintained at about 7 psia and the high pressure side at about 30 psia. A damper regulator mechanism 22 is provided to control the flow of refrigerant from the evaporator to the compressor inlet. The flow rate is modulated in response to a sensor 23, typically being electrically or pneumatically connected to the regulator that is arranged to sense the temperature of chilled substance leaving the evaporator and position the damper plate in response thereto.

At the typical operating pressure noted above, the refrigerant being used for explanatory purposes, R-11, will reach saturation at or below 120°F. The energy rejected from the system therefore is at a level which limits its practical use. The work required of a compressor to elevate the refrigerant to saturated vapor temperatures above 120°F increases drastically as this temperature increases. As a result, increasing the temperature lift of the cycle by mechanical means becomes economically unfeasible. In addition, the decomposition rate of most known refrigerants will increase greatly as the compressor discharge temperature is raised, which places further restrictions on a strictly mechanical approach to producing high lift. As will become clear from the discussion below, the present invention overcomes these long-standing difficulties in the art by providing a high lift circuit at the discharge of the compressor which takes advantage of absorptive principles to attain relatively high temperatures without the need of increasing the lift producing capability of the compressor, or increasing the compressor discharge temperatures above those normally seen in present state of the art refrigeration machines. As shown schematically in FIG. 1, the apparatus representing the high lift circuit is operationally connected into the refrigeration system between the discharge side of the compressor and the inlet side of a conventional refrigeration condenser 15. Accordingly, the high lift circuit can be conveniently retrofitted to existing units, presently operating in the field, without having to resort to major component changes or modifications.

The apparatus of the present high lift circuit includes a solution pump 36, an optional solution heat exchanger 38, a high temperature heat exchanger 25, a gravity-type separator 30, and a solution concentrator 35. Beginning at the solution pump 36, a strong solution of absorbent is drawn from the concentrator 35, passed through the optional solution heat exchanger 38, and delivered via a solution line 55 to a series of spray nozzles 39. It should be noted at this point that the term "strong solution," as herein used, refers to an absorbent solution at a concentration level whereby the solution is strong in its ability to absorb refrigerants. Similarly, the term "weak solution," will be used in reference to a solution that is in a highly dilute state and thus weak in its ability to absorb more refrigerant.

As illustrated in FIG. 1, the spray nozzles 39 are located in discharge pipe 41 of the compressor, the nozzles being positioned in the entrance region 40 of the high temperature heat exchanger 25. In operation, saturated or superheated refrigerant vapors discharged from the compressor move into the high temperature heat exchanger entrance region where the vapors are exposed to the strong solution issued from the spray nozzles. Within the mixture, some of the refrigerant vapors are absorbed by the solution, thus raising the temperature of the mixture to a level greater than the saturation temperature of the vapors discharged from the compressor.

Heat exchanger 25 is typically a single pass exchanger having a vertically aligned tube bundle 42 for carrying the high temperature mixture downwardly through the shell. A heat reclaiming substance, which can be water, is delivered into the bottom of the shell by inlet pipe 45. The reclaiming substance is caused to move generally upwardly through the shell and the flow directed through a back and forth path of travel by means of segmented baffles 46. The counterflow of the two fluids flowing over the heat transfer surfaces of the tubes produces an efficient exchange of energy between the substances whereby the temperature of the reclaiming substance is raised to about that of the high temperature mixture. Finally, the reclaiming substance is discharged from the top of the exchanger through means of discharge line 48.

By design, the absorber unit is arranged so that approximately one-half, or slightly less than one-half, of the total volumetric discharge of the compressor is absorbed by the strong solution when the circuit is operating under peak heating loads. This means that about fifty percent (50 percent) of the total energy contained in the refrigerant vapors leaving the compressor is consumed in absorption, the remaining fifty percent (50 percent) being carried through the heat exchanger in the mixture in the form of unabsorbed refrigerant vapors. As will be explained below, the energy in the unabsorbed refrigerant is employed downstream from the exchanger 25 to reconcentrate the diluted solution. Because the absorption process is basically a reversible process, about the same amount of energy consumed in absorption is required to reconcentrate the solution. By maintaining a balance of internal energy in the manner described, there will always be sufficient internal energy in the system to reconcentrate the solution for all heating loads.

The mixture leaving the tube bundle of the heat reclaiming exchanger, passes directly into gravity separator 30. The weak solution, which is in a liquid state, is collected in the reservoir area 49 of the separator while the unabsorbed refrigerant vapors, which are in a gaseous state, are allowed to pass into the horizontally aligned tube bank 50 of the downstream concentrator 35.

The weak solution collected in the reservoir 49 of the separator, is next passed through the optional solution heat exchanger 38. As the weak solution leaves the optional solution heat exchanger 38 and passes into the concentrator 35, it is flash cooled by expanding to a lower pressure. In practice, the weak solution is throttled from about the discharge pressure of the compressor to about the compressor inlet pressure, the purpose of which will become clear from the disclosure below. The pressure differential between the solution supply region in the concentrator and the reservoir in the separator, provides the motive power for transporting the weak solution through the solution heat exchanger. The supply of solution contained in the concentrator is maintained at a level to wet the surfaces of the tubes contained in the tube bank 50.

Flash cooling of the weak solution serves to lower the temperature of the solution well below that of the unabsorbed refrigerant vapors passing through the concentrator tube bank 50. Consequently, when the two substances are brought into thermal communication within the concentrator, the unabsorbed refrigerant vapors in the tubes are caused to condense, thus giving up heat energy to the weak solution stored within the supply region. It should be noted, that the solution supply region within the concentrator is operatively connected to the inlet side of the compressor by means of inlet channel 52. The compressor is thus utilized to maintain the pressure within the supply region below the vapor pressure of the solution contained therein to boil off refrigerant when the solution is heated by the condensating unabsorbed refrigerant vapors. The pure refrigerant vapors boiled out of solution are drawn through the inlet channel 52 into the compressor for reuse in the cycle.

The reconcentrated solution, which is now in a strong state, is drawn out of the concentrator by the circulating pump 36. The strong solution, under the influence of the pump, is passed through the optional solution heat exchanger 38 where heat energy is transferred from the warmer dilute solution entering the concentrator 35 to the cooler strong solution prior to its being delivered to the spray nozzles 39.

Control of the heat reclaiming process is maintained in the high lift circuit in response to the temperature of the reclaiming substance leaving the heat reclaiming exchanger. A sensing element 57 is positioned in outlet pipe 48 and adapted to send temperature information to a regulator 58 operatively connected to valve 56 in the solution line 55. When the temperature of the leaving reclaiming substance moves away from the desired level, the regulator adjusts the control valve setting to either increase or decrease the amount of solution delivered to the spray nozzles. It should be clear, however, that any suitable control device of this type can be employed to regulate the flow of solution in the manner herein described.

As can be seen, the volume of the strong solution is regulated to control the amount of refrigerant vapors absorbed within the entrance region of exchanger 25. This, in turn, determines the amount of vapor energy that will be consumed in the absorption process to develop high lift as well as the amount of energy available in the unabsorbed refrigerant vapors available for reconcentration. As noted, the high lift circuit is designed so that when it is operating under peak heating loads, sufficient energy will be available in the unabsorbed vapors to achieve reconcentration. It should also be made clear, that a self-regulating balance is established within the high lift circuit between the heat reclaiming exchanger 25 and the concentrator 35. For example, if more than the required amount of energy is consumed in the absorption process for a preselected heating load, the state of the solution leaving the exchanger 25 will be overly dilute or weak. As a result, the amount of energy contained in the unabsorbed refrigerant vapors passing into the concentrator 35 will be proportionally reduced thereby lowering the amount of energy available for reconcentrating this overly dilute solution within the concentrator 35. The concentration of the solution leaving the concentrator 35, therefore, becomes weaker resulting in correspondingly less energy being consumed in absorption during the next cycle. By the same token, when the solution delivered to the exchanger 25 is relatively dilute, less refrigerant can be absorbed and more energy becomes available in the unabsorbed vapors for concentrating, resulting in a strengthening of the solution leaving the concentrator. This process continues until a properly balanced energy relationship is established between the concentrator 35 and the heat exchanger 25 for the desired heating load.

Refrigerant moving through the concentrator tube bank, is discharged into a chamber 61 contained within the shell 15 of the refrigeration system. The state of the refrigerant entering the chamber of course varies in accordance with the amount of refrigerant condensed in the concentrator. Refrigerant in the liquid phase leaving the concentrator is dumped directly into the float valve chamber 63 of the refrigerant system. On the other hand, refrigerant vapors leaving the concentrator are carried upwardly via duct 64 to a conventional refrigeration condenser where these vapors are condensed to a liquid and then returned to the float chamber 63. The condensation of the refrigerant vapors is thus shared between the concentrator and the condenser, the amount of work performed by each being dependent upon the heat load imposed upon the high lift circuit.

From the float chamber, the refrigerant is passed through expansion valve 13 and utilized in the evaporator 12 to provide chilling. The evaporate from the evaporator is then brought to the compressor by inlet 21 where it, along with the refrigerant freed from the weak solution, is once again used in the cycle.

Figure 2:
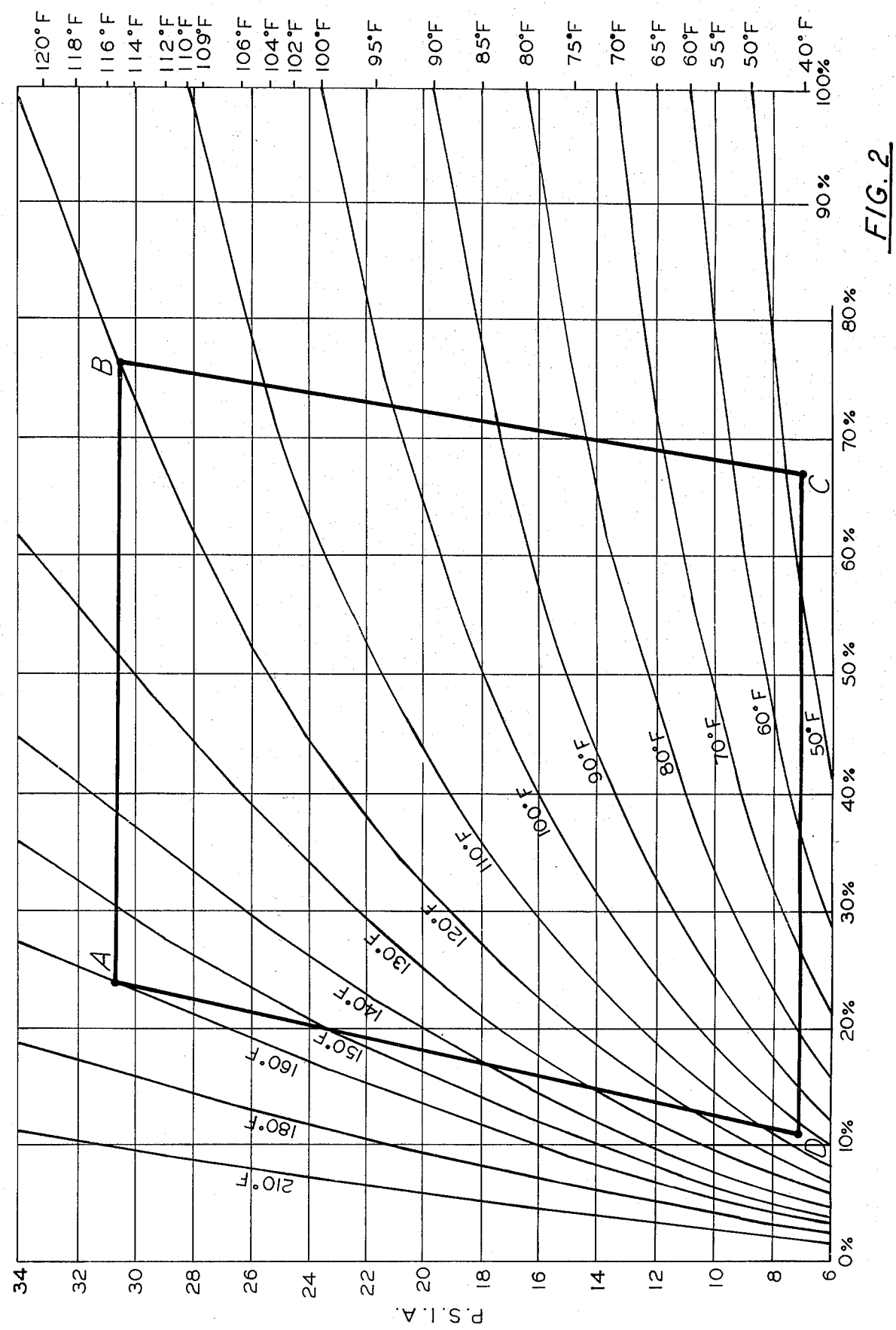
FIG. 2 is a diagrammatic representation of a high lift heat reclaiming cycle employed in the system illustrated in FIG. 1.

Referring now to the diagram shown in FIG. 2, the high lift cycle will be explained in reference to the state of the solution as it passes through the high lift circuit. Initially, it will be assumed that the optional solution heat exchanger 38 is not in the circuit. The cycle shown is plotted for a system utilizing Freon R-11 as a refrigerant and a lubricating oil, such as Texaco URSA, as an absorbent. The refrigerant concentration of the solution is plotted along the abscissa of the diagram and represents a percentage concentration by weight. The left-hand ordinate is a plot of the solution vapor pressure in psia with the corresponding saturated condensing temperature of the refrigerant noted along the right-hand ordinate. The saturated temperature of the solution is also plotted upon the diagram and is represented by the oblique curves.

Point A on the diagram represents the discharge pressure of the compressor at the entrance to the energy reclaiming heat exchanger 25. As noted for the typical example of a system employing R-11 as a refrigerant, the discharge pressure is about 30 psia, or more precisely 30.5 psia. At the discharge pressure, the saturation temperature of the refrigerant vapors is about 115°F. The strong solution sprayed into this region is exposed to the discharge pressure of the compressor and thus absorbs refrigerant vapors. As a result, the solution temperature is raised to about 160°F having a concentration of about 23 percent. The high temperature mixture then moves into the heat exchanger 25 and begins to reject heat into the reclaiming substance raising the temperature of the substance to about that of the solution. As the solution continues to reject heat into the reclaiming substance, the solution dilutes itself and eventually leaves the heat exchanger at state B. At this point, the solution is at about 120°F and is diluted down to a concentration of about 76.6 percent.

The solution and the unabsorbed refrigerant vapors, which are still at or about saturation, leave the heat exchanger 25 and are brought into the separator 30 where the components are separated as described above.

The separated weak solution is then flash cooled from state B down to state C by passing the solution through any type of conventional expansion device for achieving this result. As noted, flash cooling is accomplished by reducing the solution pressures from the discharge pressure of the compressor to the inlet pressure of the compressor or from about 30.5 psia to about 7 psia. Flash cooling, under these conditions, changes the solution concentration from 76.6 percent to about 68 percent while reducing the solution temperature to 45°F. The solution enters the concentrator 35 in this condition.

In the concentrator 35, the solution comes into thermal communication with the unabsorbed refrigerant passing through the tube bank, the vapors still being at or about saturation. The cooler weak solution condenses the vapors and the latent heat is rejected into the solution. The solution, being exposed to the inlet of the compressor boils, driving off refrigerant, thus bringing the solution to state D. During reconcentration, the solution supply in the concentrator is ideally brought from about 67 percent refrigerant to about 10.5 percent, while the temperature is raised to about 105°F.

The reconcentrated solution at state D is then moved by the circulating pump 36 to the spray nozzles 39 where it is exposed to the discharge pressure of the compressor. Upon being sprayed into the discharge, the state of the solution changes from state D to state A, and the cycle is once again repeated.

While this invention has been described with reference to the structure herein disclosed, it is not necessarily confined to the details as set forth, and this application is intended to cover any modifications or changes as may come within the scope of the following claims.

What is claimed is:

1. The method of developing a high temperature lift at the discharge of a compressor as employed in a vapor compression refrigeration system including
    exposing refrigerant vapors discharged from the compressor to a concentrated absorbent solution to develop temperatures in the mixture above the saturation temperature of the refrigerant, and
    transferring the high temperature heat energy to a substance for recovery thereof.

2. The method of claim 1 further including the steps of separating the unabsorbed refrigerant vapors and the diluted solution after heat transfer and reconcentrating the dilute solution for reuse in the process.

3. The method of claim 2 wherein reconcentration of the dilute solution is accomplished by utilizing the energy in the unabsorbed refrigerant vapors to boil refrigerant from the dilute solution.

4. The method of claim 3 including the further step of collecting refrigerant after reconcentrating and reusing the refrigerant in the refrigeration system.

5. The method of claim 2 further including the step of flash cooling the dilute solution and bringing the unabsorbed refrigerant vapors in thermal communication with said flash cooled solution to boil refrigerant from said solution.

6. The method of claim 5 wherein the flash cooled dilute solution is exposed to the inlet of the compressor during the reconcentration step.

7. The method of claim 2 further including the step of controlling the flow of solution to the compressor discharge to regulate the amount of energy consumed in absorption.

8. The method of developing a high temperature lift in a refrigeration system employing a vapor compressor including
    exposing a strong absorbent solution to the refrigerant vapors discharged from the vapor compressor to develop a high temperature mixture which is at a temperature level above that of the discharge vapors,
    transferring the heat energy in the high temperature mixture to a heat reclaiming substance whereby the temperature of the reclaiming substance is raised to about that of the high temperature mixture,
    separating the diluted solution from the unabsorbed vapors after heat transfer,
    flash cooling the separated dilute solution by exposing the solution to the low pressure inlet to the compressor,
    placing the unabsorbed refrigerant vapors in thermal communication with the flash cooled solution to condense the vapors whereby refrigerant is boiled from the solution thus reconcentrating the solution, and
    recirculating the reconcentrated solution to the compressor discharge for reuse.

9. The method of claim 8 further including the step of delivering the unabsorbed refrigerant to the refrigeration system after reconcentration of the solution and further condensing any vapors remaining therein whereby the refrigerant is placed in a condition for use in refrigeration.

10. The method of claim 9 further including the step of controlling the amount of reconstituted solution recirculated to the compressor discharge to regulate the amount of energy consumed in developing high temperatures in the mixture.

11. The method of claim 10 whereby energy consumed in developing the high temperature mixture is equal to or less than the energy consumed in reconcentrating the dilute solution.

12. The method of claim 9 wherein the refrigerant used in the refrigeration system is delivered to the inlet of the compressor where it is mixed with the refrigerant boiled from the reconcentrated solution.

13. The method of claim 8 further including the step of preheating the reconstituted solution as it is being recirculated by placing the solution in heat transfer relation with the warmer dilute solution prior to the dilute solution being flash cooled.

14. In a refrigeration system of the type including a condenser, an evaporator, an expansion mechanism for throttling refrigerant between the condenser and the evaporator, and a vapor compressor for raising the state of refrigerant vapors leaving the evaporator, the improvement comprising spray means for exposing the discharged vapors leaving the compressor to an absorbent solution to develop a high temperature mixture, a heat exchanger for transferring heat energy from the mixture to a reclaiming substance, separating means for separating unabsorbed refrigerant vapors from the diluted solution leaving the exchanger, a concentrator interposed between the condenser and the separator through which the unabsorbed vapors pass from the separator to the condenser in heat transfer relation with a supply of solution contained therein, and expansion means for flash cooling the separated diluted solution and delivering the solution to the supply of solution in said concentrator whereby heat energy is transferred from the vapors to the flash cooled solution to boil refrigerant therefrom thus reconcentrating the solution.

15. The apparatus of claim 14 further including a circulating pump for moving the reconcentrated solution from the concentrator to the spray means.

16. The apparatus of claim 14 having further means for exposing the flash cooled solution in the concentrator to the inlet of the compressor to allow the heat energy transferred from the vapors to sustain the boiling of refrigerant from the solution.

17. The apparatus of claim 15 including a control means for regulating the amount of solution moving between the concentrator and the spray means.

18. A high temperature circuit operatively connected between the discharge region of a vapor compressor and a condenser in a refrigeration system to act upon refrigerant moving therebetween including a concentrator having a supply area for collecting and storing an absorbent solution and flow means to bring refrigerant moving between the compressor and the condenser into thermal communication with the solution, pump means for delivering solution from the concentrator into the vapor discharge region of the compressor wherein at least some of the vapors are absorbed by the solution to raise the temperature of the discharge, heat exchange means for transferring heat energy in the high temperature mixture to a heat reclaiming substance, means to separate the dilute solution leaving the heat exchanger from the unabsorbed refrigerant vapors prior to the refrigerant vapors moving through the concentrator to the condenser, and expansion means for flash cooling the separated dilute solution and delivering the solution into the supply region of the concentrator whereby the unabsorbed vapors passing through the concentrator are condensed therein to boil refrigerant from the solution.

19. The apparatus of claim 18 wherein the supply area of the concentrator is connected to the inlet of the compressor whereby refrigerant boiled from the solution is drawn into the compressor.

20. The apparatus of claim 19 further including control means for regulating the amount of solution delivered from the concentrator into the discharge region of the compressor.

21. The apparatus of claim 20 wherein the amount of solution delivered into the compressor discharge region is regulated so that the amount of energy stored in the vapors consumed in absorption is less than or equal to the amount of energy consumed in reconcentration of the solution.

22. The apparatus of claim 18 including further means for transferring heat energy from the dilute solution separated from the refrigerant vapors and the reconcentrated solution pumped to the compressor discharge region prior to the dilute solution being flash cooled.

23. The apparatus of claim 18 wherein the heat exchange means is a counterflow heat exchanger for raising the temperature of the reclaiming substance close to that of the high temperature mixture.

24. Apparatus for developing a high lift in a vapor compression refrigeration system to raise the temperature of the energy rejected therefrom including means for introducing an absorbent into the vapor discharge of the compressor whereby at least some of the vapors are absorbed and condensed to raise the temperature of the mixture above the normal discharge temperature, heat exchange means for transferring heat energy from the high temperature mixture to a heat reclaiming substance, and means for placing the unabsorbed refrigerant vapors in thermal communication with the dilute solution after heat transfer to reconcentrate said solution.

* * * * *